(12) United States Patent
Vankamamidi et al.

(10) Patent No.: US 10,769,020 B2
(45) Date of Patent: Sep. 8, 2020

(54) SHARING PRIVATE SPACE AMONG DATA STORAGE SYSTEM DATA REBUILD AND DATA DEDUPLICATION COMPONENTS TO MINIMIZE PRIVATE SPACE OVERHEAD

(71) Applicant: EMC IP Holding Company LLC, Hopkinton, MA (US)

(72) Inventors: Vamsi K. Vankamamidi, Hopkinton, MA (US); Philippe Armangau, Acton, MA (US); Steven A. Morley, Mendon, MA (US); Shuyu Lee, Acton, MA (US); Daniel E. Cummins, Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/263,347

(22) Filed: Jan. 31, 2019

(65) Prior Publication Data

US 2020/0250040 A1 Aug. 6, 2020

(51) Int. Cl.
| | | |
|---|---|---|
| *G06F 11/14* | (2006.01) | |
| *G06F 3/06* | (2006.01) | |
| *G06F 11/16* | (2006.01) | |
| *G06F 11/20* | (2006.01) | |

(52) U.S. Cl.
CPC .......... *G06F 11/1435* (2013.01); *G06F 3/067* (2013.01); *G06F 3/0614* (2013.01); *G06F 3/0631* (2013.01); *G06F 3/0641* (2013.01); *G06F 11/1469* (2013.01); *G06F 11/1662* (2013.01); *G06F 11/2094* (2013.01); *G06F 2201/82* (2013.01)

(58) Field of Classification Search
CPC .......................... G06F 12/0261; G06F 9/5061
See application file for complete search history.

(56) References Cited

U.S. PATENT DOCUMENTS

| | | | | |
|---|---|---|---|---|
| 7,389,508 B2 * | 6/2008 | Aguilar, Jr. | ........... | G06F 9/5061 711/147 |
| 8,442,952 B1 * | 5/2013 | Armangau | .......... | G06F 16/1752 707/686 |
| 9,537,705 B1 | 1/2017 | Dutch et al. | | |
| 9,626,305 B1 | 4/2017 | Dutch et al. | | |
| 9,959,275 B2 * | 5/2018 | Vijayan | ............... | G06F 11/1453 |

(Continued)

*Primary Examiner* — Tammara R Peyton
(74) *Attorney, Agent, or Firm* — BainwoodHuang

(57) ABSTRACT

Techniques for sharing private space among storage system components. The techniques include determining an amount of private space for each of a rebuild component, an FSCK component, and a deduplication component, reserving private space equal to the sum of (i) the amount determined for the rebuild component and (ii) the maximum of the amounts determined for the FSCK and deduplication components, and allocating the remaining amount of storage space as user space. If a storage device fails, then the rebuild component rebuilds the failed drive data on a hot spare drive in the private space reserved for the rebuild component. If data files become corrupted, then the FSCK component performs offline recovery operations using the private space for the hot spare drive. If such private space for the hot spare drive is unavailable, then the FSCK component performs offline recovery operations using the private space reserved for the deduplication component.

17 Claims, 5 Drawing Sheets

(56) References Cited

U.S. PATENT DOCUMENTS

| | | | |
|---|---|---|---|
| 10,089,183 B2 * | 10/2018 | Sarab .................. | G06F 16/2365 |
| 10,191,759 B2 * | 1/2019 | Cowperthwaite ... | G06F 9/45558 |
| 10,498,821 B1 * | 12/2019 | Bono .................. | H04L 67/1095 |
| 2012/0331242 A1 * | 12/2012 | Shaikh ................ | G06F 12/0261 |
| | | | 711/154 |

\* cited by examiner

SHARING PRIVATE SPACE AMONG DATA STORAGE SYSTEM DATA REBUILD AND DATA DEDUPLICATION COMPONENTS TO MINIMIZE PRIVATE SPACE OVERHEAD

BACKGROUND

Data storage systems generally reserve private storage space on one or more storage devices or drives for storing data used internally and/or privately by certain storage system components, such as a data rebuild component, a file system checking (FSCK) component, and a data deduplication component, among others. Such private storage space is typically reserved for (i) the data rebuild component to implement a "hot spare" drive in the event of a storage drive failure, (ii) the FSCK component for use in offline FSCK recovery operations, and (iii) the data deduplication component for storing identifiers (e.g., hash values) for a stream of data elements received at the storage systems.

SUMMARY

To assure that data storage systems remain cost competitive in a growing array of storage system markets, storage system designers have sought to reduce the amount of private storage space consumed in the data storage systems. In this way, the cost of data storage systems, in terms of dollars per gigabyte (GB) of capacity, can be reduced. However, reducing the amount of private storage space consumed in data storage systems has been problematic for storage system designers because the storage system components that rely on the availability of such private storage space (e.g., data rebuild components, file system checking (FSCK) components, data deduplication components, etc.) are vital for maintaining storage system efficiency and data integrity. For this reason, storage system designers have typically designed data storage systems to reserve or pre-provision a sufficient amount of private storage space for each such storage system component, and to operate the data storage systems within this constraint.

Techniques are disclosed herein for sharing private storage space among storage system components of a data storage system. The disclosed techniques can include (i) determining an amount of the private storage space to be utilized by each of a data rebuild component, an FSCK component, and a data deduplication component, (ii) allocating, as the private storage space, an amount of storage space equal to the sum of (a) the amount determined for the data rebuild component, and (b) the maximum of the amounts determined for the FSCK component and the data deduplication component, and (iii) allocating a remaining amount of the storage space as user storage space. If a storage drive fails, then the data rebuild component can perform operations to rebuild the failed storage drive data, using an amount of the private storage space initially reserved or provisioned for the data rebuild component as a "hot spare" drive. If data files stored on the data storage system become corrupted and the hot spare drive has not yet been used, then the FSCK component can perform offline FSCK recovery operations, using the amount of the private storage space initially reserved or provisioned for the hot spare drive. Otherwise, if the hot spare drive has been used and is now unavailable, then the FSCK component can perform offline FSCK recovery operations using an amount of the private storage space initially reserved or provisioned for the data deduplication component as a deduplication index. By sharing the private storage space among the data rebuild component, the FSCK component, and the data deduplication component, the total amount of the private storage space consumed in the data storage system can be reduced, thereby increasing the cost competitiveness of the data storage system while assuring the availability of sufficient amounts of the private storage space when needed by the respective storage system components.

In certain embodiments, a method of sharing private storage space among storage system components of a data storage system includes determining an amount of private storage space for use by each of a plurality of storage system components of a data storage system, and initially provisioning the determined amounts of private storage space for fewer than all of the plurality of storage system components on at least one storage drive of the data storage system, in which at least one of the respective storage system components has a determined amount of private storage space not initially provisioned on the at least one storage drive. The method further includes sharing at least one of the provisioned amounts of private storage space for use by at least one of the respective storage system components for which the determined amount is not initially provisioned.

In certain arrangements, the plurality of storage system components include a data rebuild component, an FSCK component, and a data deduplication component, and the method further includes determining the amount of private storage space for use by each of the data rebuild component, the FSCK component, and the data deduplication component.

In certain arrangements, the method further includes determining a sum of (i) the amount of private storage space determined for use by the data rebuild component, and (ii) a maximum of (a) the amount of private storage space determined for use by the FSCK component and (b) the amount of private storage space determined for use by the data deduplication component.

In certain arrangements, the method further includes allocating an amount of the private storage space equal to the determined sum.

In certain arrangements, the method further includes initially provisioning, as a deduplication index in the allocated amount of the private storage space, the amount of private storage space determined for use by the data deduplication component.

In certain arrangements, the method further includes initially provisioning, as a hot spare drive in the allocated amount of the private storage space, the amount of private storage space determined for use by the data rebuild component in the allocated amount of the private storage space.

In certain arrangements, the method further includes detecting a failure of a failed storage drive of the data storage system, and performing, by the data rebuild component, a data rebuild operation to rebuild data of the failed storage drive on the hot spare drive.

In certain arrangements, the data storage system includes a file system, and the method further includes detecting corruption of a data file of the file system, and, having detected the corruption of the data file, taking the data storage system offline.

In certain arrangements, the method further includes re-provisioning the amount of private storage space initially provisioned as the hot spare drive for use by the FSCK component, and performing, by the FSCK component, an FSCK recovery operation to recover inconsistent metadata of the file system to a consistent state using the re-provisioned amount of private storage space.

In certain arrangements, the method further includes determining that the hot spare drive is unavailable, and re-provisioning the amount of private storage space initially provisioned as the deduplication index for use by the FSCK component.

In certain arrangements, the method further includes performing, by the FSCK component, an FSCK recovery operation to recover inconsistent metadata of the file system to a consistent state using the re-provisioned amount of private storage space.

In certain arrangements, the method further includes, having performed the FSCK recovery operation, re-provisioning the amount of private storage space provisioned for use by the FSCK component as another deduplication index, and bringing the data storage system back online.

In certain embodiments, a data storage system includes at least one storage drive, a memory, and storage processing circuitry configured to execute a computer program out of the memory (i) to determine an amount of private storage space for use by each of a plurality of storage system components of a data storage system, (ii) to initially provision the determined amounts of private storage space for fewer than all of the plurality of storage system components on at least one storage drive of the data storage system, at least one of the respective storage system components having a determined amount of private storage space not initially provisioned on the at least one storage drive, and (iii) to share at least one of the provisioned amounts of private storage space for use by at least one of the respective storage system components for which the determined amount is not initially provisioned.

In certain embodiments, a computer program product includes a set of non-transitory, computer-readable media having instructions that, when executed by processing circuitry of a computerized apparatus, cause the processing circuitry to perform a method of sharing private storage space among storage system components of a data storage system. The method includes determining an amount of private storage space for use by each of a plurality of storage system components of a data storage system, and initially provisioning the determined amounts of private storage space for fewer than all of the plurality of storage system components on at least one storage drive of the data storage system, in which at least one of the respective storage system components has a determined amount of private storage space not initially provisioned on the at least one storage drive. The method further includes sharing at least one of the provisioned amounts of private storage space for use by at least one of the respective storage system components for which the determined amount is not initially provisioned.

Other functions and aspects of the claimed features of this disclosure will be evident from the Detailed Description that follows.

BRIEF DESCRIPTION OF THE DRAWINGS

The foregoing and other objects, features and advantages will be apparent from the following description of particular embodiments of the disclosure, as illustrated in the accompanying drawings in which like reference characters refer to the same parts throughout the different views.

FIG. 1b is a block diagram of storage system components of the data storage system of FIG. 1a;

FIG. 1c is a block diagram of storage space implemented by an array of storage devices or drives of the data storage system of FIG. 1a;

DETAILED DESCRIPTION

Techniques are disclosed herein for sharing private storage space among storage system components of a data storage system. The disclosed techniques can include determining an amount of private storage space to be utilized by each of a data rebuild component, a file system checking (FSCK) component, and a data deduplication component, reserving an amount of private storage space equal to the sum of (i) the amount determined for the data rebuild component and (ii) the maximum of the amounts determined for the FSCK component and the data deduplication component, and allocating the remaining amount of storage space as user storage space. If a storage device or drive fails, then the data rebuild component can perform operations to rebuild the failed storage drive data on a "hot spare" drive implemented in the private storage space reserved for the data rebuild component. If data files stored on the data storage system become corrupted, then the FSCK component can perform offline FSCK recovery operations using the private storage space for the hot spare drive. If such private storage space for the hot spare drive is unavailable, then the FSCK component can perform offline FSCK recovery operations using the private storage space reserved for the data deduplication component.

Figure 1A:
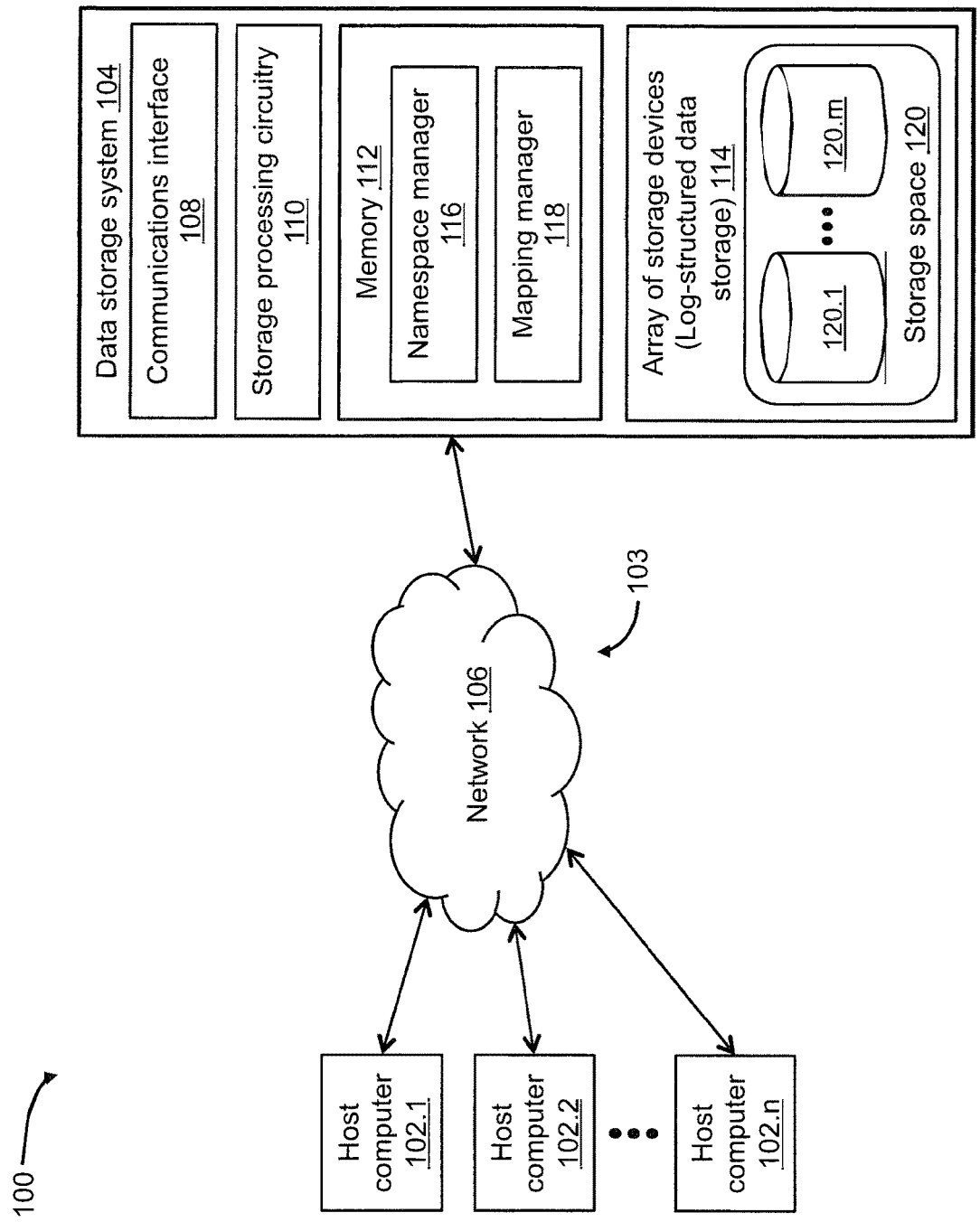
FIG. 1a is a diagram illustrating an exemplary storage system environment, in which techniques can be practiced for sharing private storage space among storage system components of a data storage system.

FIG. 1a depicts an illustrative embodiment of an exemplary storage system environment 100, in which techniques can be practiced for sharing private storage space among storage system components of a data storage system. As shown in FIG. 1a, the storage system environment 100 can include a plurality of host computers 102.1, 102.2, . . . , 102.n communicably coupled to a data storage system 104 by a communications medium 103, which can include at least one network 106. For example, each of the plurality of host computers 102.1, . . . , 102.n may be configured as a web server computer, a file server computer, an email server computer, an enterprise server computer, and/or any other suitable client or server computer or computerized device configured to provide storage input/output (IO) requests (e.g., small computer system interface (SCSI) commands, network file system (NFS) commands) to the data storage system 104 over the communications medium 103. Such storage IO requests provided by the plurality of host computers 102.1, . . . , 102.n can direct the data storage system 104 to store (e.g., write) or retrieve (e.g., read) data pages, data files, data blocks, and/or any other suitable data elements to or from volumes, file systems, and/or any other suitable storage objects on behalf of the respective host computers 102.1, . . . , 102.n.

The communications medium 103 can be configured to interconnect the plurality of host computers 102.1, . . . , 102.n and the data storage system 104 to enable them to communicate and exchange data and control signals. As shown in FIG. 1a, the communications medium 103 is illustrated as a "cloud" to represent a variety of different communications topologies, including, but not limited to, a backbone topology, a hub-and-spoke topology, a loop topology, an irregular topology, or any suitable combination thereof. As such, the communications medium 103 can include, but is not limited to, copper-based data communications devices and cabling, fiber optic devices and cabling, wireless devices, or any suitable combination thereof. Further, the communications medium 103 can be configured to support storage area network (SAN)-based communications, network attached storage (NAS)-based communications, local area network (LAN)-based communications, metropolitan area network (MAN)-based communications, wide area network (WAN)-based communications, wireless communications, distributed infrastructure communications, and/or any other suitable wired, wireless, or fiber communications.

As further shown in FIG. 1a, the data storage system 104 can include a communications interface 108, storage processing circuitry 110, a memory 112, and an array of storage devices or drives 114. The communications interface 108 can include SCSI target adapters, network interface adapters, and/or any other suitable adapters for converting electronic, wireless, and/or optical signals received over the network 106 to a form suitable for use by the storage processing circuitry 110. The memory 112 can include persistent memory (e.g., flash memory, magnetic memory) and non-persistent cache memory (e.g., dynamic random access memory (DRAM), static random access memory (SRAM)), and can accommodate a variety of storage system constructs or components, including a namespace manager 116 and a mapping manager 118. It is noted that, in various embodiments, the namespace manager 116 and the mapping manager 118 can be implemented using any suitable hardware, software, or firmware configuration(s), or any suitable combination thereof.

The namespace manager 116 can be configured to maintain a namespace of storage objects, such as volumes (e.g., virtual volumes (VVOLs), logical storage units (LUNs)), file systems, and/or any other suitable storage objects, accessible to the plurality of host computers 102.1, . . . , 102.n. In general, a namespace is a point-in-time (PIT) logical collection of such storage objects, each of which can be represented by an index node (also referred to herein as an "inode"). In one embodiment, the namespace maintained by the namespace manager 116 can include a set of storage objects (e.g., VVOLs) organized as a collection of inodes. For example, each such VVOL may be made up of one or more storage extents or segments, each of which may correspond to a range of storage sizes (e.g., 1 megabyte (Mb), 4 Mbs) in a logical address space. Further, the range of storage sizes may correspond to a range of contiguous or noncontiguous logical addresses spanning some or all of the VVOL.

The mapping manager 118 can be configured to map storage extents or segments of volumes (e.g., VVOLs, LUNs) to corresponding redundant array of independent disk (RAID) addresses, which, in turn, can be mapped to corresponding drive locations in the array of storage devices 114. The array of storage devices 114 can include storage space 120 implemented by a plurality of storage drives 120.1, . . . 120.m (e.g., magnetic drives, solid state drives (SSDs), optical drives) managed by a RAID manager. The storage processing circuitry 110 can include one or more physical storage processors or engines, data movers, director boards, blades, IO modules, storage drive controllers, switches, and/or any other suitable computer hardware or combination thereof. In one embodiment, the storage processing circuitry 110 running specialized software can process storage IO requests provided by the respective host computers 102.1, . . . , 102.n over the communications medium 103, and store user data as log-structured data in a RAID environment implemented by the array of storage devices 114.

In the context of the storage processing circuitry 110 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (n), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein. For example, such media may be considered to be articles of manufacture, and may be transportable from one data storage appliance to another data storage appliance.

Figure 1C:
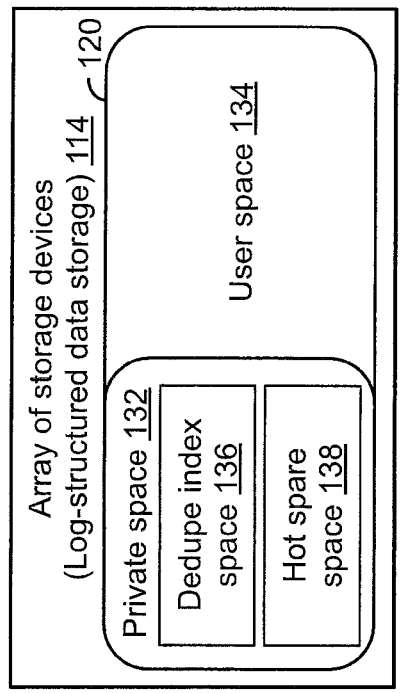
Figure 1B:
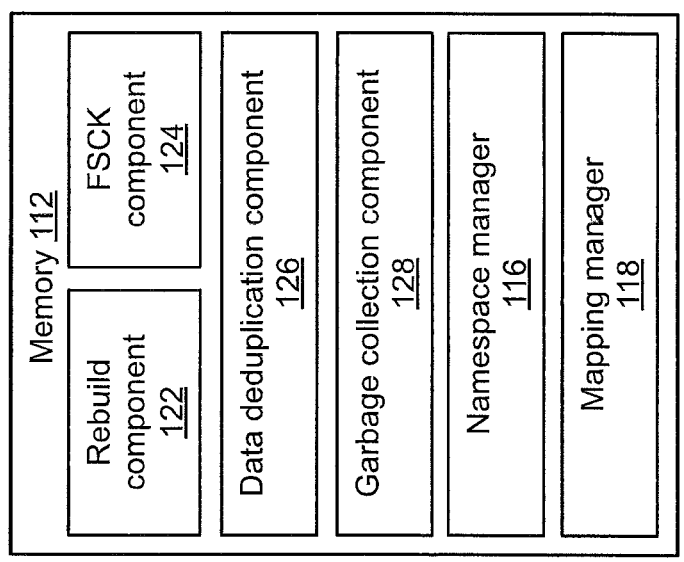

FIG. 1b depicts an illustrative embodiment of storage system components that can be accommodated in the memory 112 of the data storage system 104. As shown in FIG. 1b, the memory 112 can accommodate several storage system constructs or components in addition to the namespace manager 116 and the mapping manager 118, namely, a data rebuild component 122, a file system checking (FSCK) component 124, a data deduplication component 126, and a garbage collection component 128. It is noted that, like the namespace manager 116 and the mapping manager 118, the data rebuild component 122, the FSCK component 124, the data deduplication component 126, and the garbage collection component 128 can be implemented, in various embodiments, using any suitable hardware, software, or firmware configuration(s), or any suitable combination thereof.

The data rebuild component 122 can be configured, when a failure occurs in one of the plurality of storage drives 120.1, . . . , 120.m, to logically replace the failed storage drive with a spare storage drive (also referred to herein as the "hot spare drive"), and to rebuild data onto the hot spare drive to match the data previously stored on the failed storage drive. For example, the failed storage drive may have become unresponsive to storage IO requests (e.g., read requests, write requests) from the respective host computers 102.1, . . . , 102.n. To rebuild data onto the hot spare drive, the data rebuild component 122 can read data (e.g., parity information) from one or more of the other (operative) storage drives 120.1, . . . , and/or 120.m, compute the data for the spare storage drive based on the parity information, and write the computed data to the hot spare drive. For example, the hot spare drive provided to replace the failed storage drive might be logically added to a RAID group, or physically added to the data storage system 104. It is noted that such a RAID group can include multiple storage drives of the same type (e.g., magnetic drives, SSDs, optical drives), and be arranged in accordance with various RAID configurations (e.g., RAID-1, RAID-5, RAID-6). By rebuilding data onto the hot spare drive, such a RAID group can be restored to its original level of redundancy.

The FSCK component 124 can be configured to detect and address inconsistencies in file systems implemented on the data storage system 104. The FSCK component 124 can verify metadata of a file system, and recover inconsistent metadata to a consistent state to restore the integrity of the file system. For example, to verify the metadata of the file system, the FSCK component 124 may traverse the metadata to gather status and bitmap information, store the status and bitmap information on the data storage system 104, validate the correctness of the metadata using the stored information, and repair any inconsistencies detected in the metadata during its validation. Because data files of the file system cannot be written to while the FSCK component 124 is performing its tasks, the data storage system 104 is typically taken offline, preventing users from accessing their data stored on the data storage system 104 while the file system checking is taking place.

The data deduplication component 126 can be configured to break a data stream received at the data storage system 104 into a series of data elements, and, before storing each data element, to determine the presence of the data element in the data storage system 104 to avoid storing it multiple times. For example, the data deduplication component 126 may generate an identifier (e.g., a hash value) for each data element, and compare the hash value with other previously generated hash value entries in a deduplication index on the data storage system 104. The hash value entries in the deduplication index can correspond to unique (or deduplicated) data elements of a deduplication domain previously stored on the data storage system 104. If the hash value of the data element matches one of the other hash value entries in the deduplication index, then the data deduplication component 126 can perform a check to determine whether the data element is identical to (or a duplicate of) a previously stored data element that corresponds to the matching hash value. If the data element is determined to be a duplicate of a previously stored data element, then the data deduplication component 126 can generate and store metadata about the duplicate data element, and remove the duplicate data element from the data storage system 104. If the hash value of the data element does not match any of the hash value entries in the deduplication index, then the data deduplication component 126 can compress the data element for storage on the data storage system 104, and provide the hash value of the data element as a new entry in the deduplication index.

As described herein, the storage processing circuitry 110 running specialized software can process storage IO requests provided by the respective host computers 102.1, . . . , 102.n, and store user data (e.g., data blocks) as log-structured data. In one embodiment, the storage processing circuitry 110 can sequentially write the data blocks as log-structured data onto fixed extents or segments of storage media, and maintain information about the respective extents or segments and any overwritten, unmapped, or otherwise deleted data blocks in one or more databases. The garbage collection component 128 can be configured to perform, in a background process, ordered traversals of the respective database(s) to "clean" the stored extents or segments of log-structured data, recovering storage space on the respective extents or segments that may have been previously consumed by overwritten, unmapped, or otherwise deleted data blocks.

FIG. 1c depicts an illustrative embodiment of the storage space 120 implemented by the plurality of storage drives 120.1, . . . 120.m within the array of storage devices 114 of the data storage system 104. As shown in FIG. 1c, the storage space 120 can include both private storage space (also referred to herein as "restricted access space" or simply "private space") 132 and user storage space (also referred to herein as "user space") 134. The private space 132 can be configured to store data used internally and/or privately by certain storage system components of the data storage system 104, such as the data rebuild component 122, the FSCK component 124, and the data deduplication component 126, as described hereinbelow with reference to an illustrative example. For example, the storage processing circuitry 110 running specialized software may reserve or provision, in the private space 132, a first amount of storage space 136 for the deduplication index (also referred to herein as the "dedupe index space"), as well as a second amount of storage space 138 for the hot spare drive (also referred to herein as the "hot spare space"). It is noted that the storage processing circuitry 110 can also reserve or provision, in the private space 132, suitable amounts of storage space for configuration information, state information, information for initializing a file system, and/or any other suitable data and/or information used internally and/or privately by storage system components of the data storage system 104. Further, the storage processing circuitry 110 running specialized software may allocate a remaining amount of the storage space 120 as the user space 134, which is accessible to users of the data storage system 104 (e.g., users of the respective host computers 102.1, . . . , 102.n) for storing host or user data.

During operation, the data storage system 104 (see FIG. 1a) can share the private space 132 (see FIG. 1c) among the data rebuild component 122, the FSCK component 124, and the data deduplication component 126 (see FIG. 1b). To that end, the data storage system 104 can (i) determine an amount of the private space 132 to be utilized by each of the data rebuild component 122, the FSCK component 124, and the data deduplication component 126, (ii) allocate, as the private space 132, an amount of the storage space 120 equal to the sum of (a) the amount determined for the data rebuild component 122 and (b) the maximum of the amounts determined for the FSCK component 124 and the data deduplication component 126, and (iii) allocate the remaining amount of the storage space 120 as the user space 134. If one of the plurality of storage drives 120.1, . . . , 120.m fails, then the data rebuild component 122 can perform operations to rebuild the failed storage drive data using the hot spare space 138 initially reserved or provisioned for the data rebuild component 122. If data files stored on the data storage system 104 become corrupted and the hot spare space 138 has not yet been used by the data rebuild component 122, then the FSCK component 124 can perform offline FSCK recovery operations using the hot spare space 138. Otherwise, if the hot spare space 138 has been used and is now unavailable, then the FSCK component 124 can perform offline FSCK recovery operations using the dedupe index space 136 initially reserved or provisioned for the data deduplication component 126. By sharing the private space 132 among the data rebuild component 122, the FSCK component 124, and the data deduplication component 126, the total amount of the private space 132 consumed in the data storage system 104 can be reduced, increasing the cost competitiveness of the data storage system 104 while assuring the availability of sufficient amounts of the private space 132 when needed by the respective storage system components.

Figure 2A:
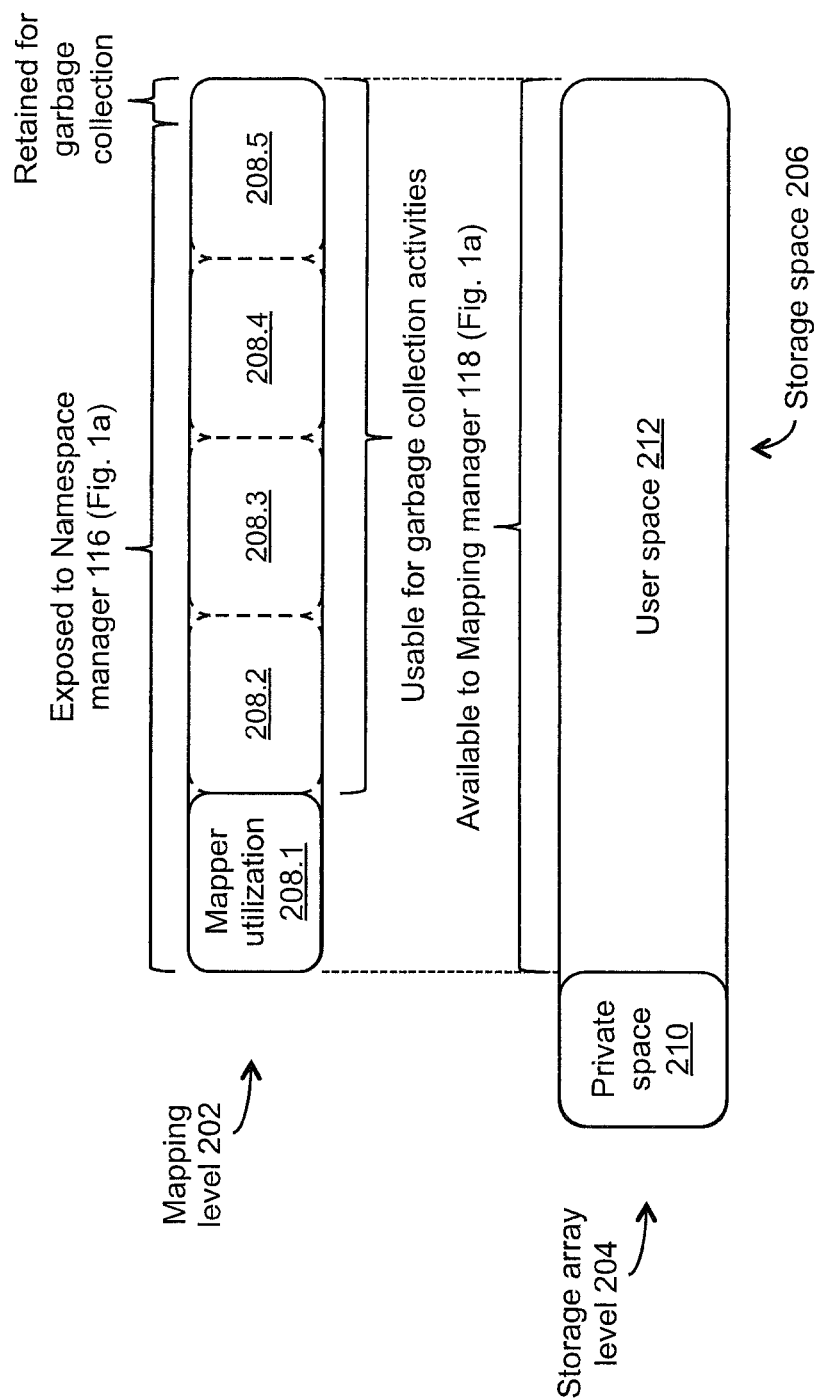
FIGS. 2a-2d are diagrams illustrating an exemplary scenario for practicing the techniques of FIG. 1a, involving storage space that includes both shared private storage space and user storage space.

The disclosed techniques for sharing private storage space among storage system components of a data storage system will be further understood with reference to the following illustrative example, as well as FIGS. 1a, 1b, and 2a-2d. FIG. 2a depicts a representation of an exemplary storage space 206 in relation to a mapping level 202 and a storage array level 204 of a data storage system, such as the data storage system 104 (see FIG. 1a). As shown in FIG. 2a, at the storage array level 204, the storage space 206 can include both private space 210 and user space 212. In this example, it is assumed that the private space 210 can be shared among certain storage system components of the data storage system 104, such as the data rebuild component 122, the FSCK component 124, and the data deduplication component 126 (see FIG. 1b), for storing data used internally and/or privately by the respective storage system components, and that other such internal and/or private data or information (e.g., configuration information, state information, information for initializing a file system, etc.) are omitted from consideration. It is further assumed that a total amount of the storage space 206 available in the data storage system 104 can be equal to about 107 terabytes (TB), or any other suitable amount of storage space.

During initialization or startup of the data storage system 104, the storage processing circuitry 110 running specialized software can determine (e.g., from historical or empirical data) an amount of the private space 210 to be utilized by each of the data rebuild component 122, the FSCK component 124, and the data deduplication component 126. For example, an amount of the private space 210 may be determined for each of (i) the data rebuild component 122 to implement a hot spare drive in the event of a storage drive failure, (ii) the FSCK component 124 for use in offline FSCK recovery operations, and (iii) the data deduplication component 126 for storing identifiers (e.g., secure hash algorithm (SHA) keys) for a stream of data elements received at the data storage system 104. In one exemplary embodiment, the amount determined for the data rebuild component 122 can be equal to about 4% of the available storage space 206 (or about 4 TB), the amount determined for the FSCK component 124 can be equal to about 3% of the available storage space 206 (or about 3 TB), and the amount determined for the data deduplication component 126 can be equal to about 2% of the available storage space 206 (or about 2 TB).

Once the amounts of the private space 210 to be utilized by the respective storage system components 122, 124, 126 have been determined, the storage processing circuitry 110 can allocate a total amount of the private space 210 equal to the sum of (i) the amount determined for the data rebuild component 122, e.g., 4 TB, and (ii) the maximum of the amounts of 3 TB and 2 TB determined for the FSCK component 124 and the data deduplication component 126, respectively. The total amount of the allocated private space 210 can therefore be equal to the sum of 4 TB and 3 TB, or 7 TB. Having allocated 7 TB of the storage space 206 as the private space 210, the storage processing circuitry 110 can allocate a remaining amount of the storage space 206, e.g., 100 TB, as the user space 212.

In one embodiment, the data storage system 104 can allow up to the entire amount of the user space 212 at the storage array level 204 (e.g., 100 TB) to be made available for use by the mapping manager 118 at the mapping level 202. Further, the data storage system 104 can be configured to store host or user data as log-structured data in a RAID environment implemented by the array of storage devices 114 (see FIG. 1a). To assure high performance of the data storage system 104, utilization of the user space 212 at the mapping level 202 for receiving host or user data and storing the received data as log-structured data is kept low, as illustrated by a portion of the user space 212 at the mapping level 202 labeled "mapper utilization" (reference numeral 208.1; see FIG. 2a). For example, the portion of the user space 212 corresponding to the mapper utilization 208.1 may be equal to about one-fifth of the total amount of the user space 212, or about 20 TB. As shown in FIG. 2a, remaining portions 208.2, 208.3, 208.4, 208.5 of the user space 212 at the mapping level 202 (e.g., about four-fifths of the total amount of the user space 212, or about 80 TB) can be used by the garbage collection component 128 for performing garbage collection operations or activities, e.g., recovering storage space on any storage extents or segments that may have been previously consumed by overwritten, unmapped, or otherwise deleted data blocks. As further shown in FIG. 2a, a reduced amount (e.g., about 95 TB) of the user space 212 at the mapping level 202 can be exposed to the namespace manager 116, while a remaining amount (e.g., about 5 TB) of the user space 212 can be retained and set aside for use while performing garbage collection operations or activities.

Figure 2B:
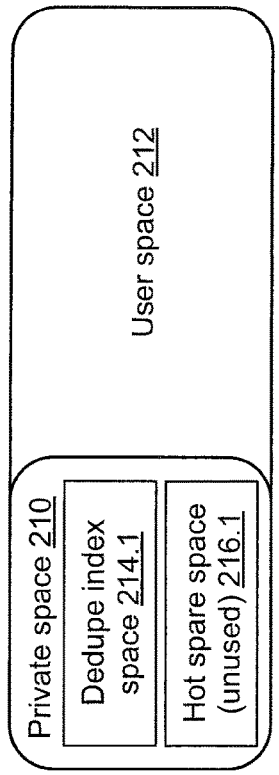
Figure 2C:
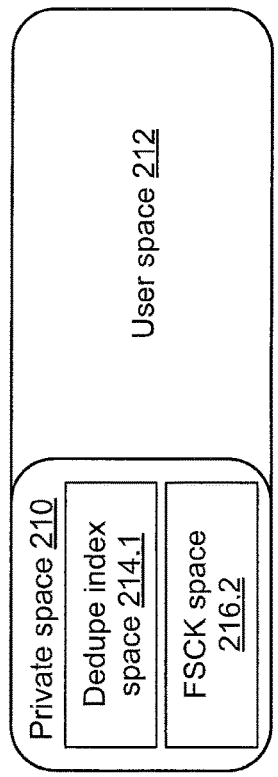

Having allocated the respective amounts of the storage space 206 as the private space 210 and the user space 212, the storage processing circuitry 110 miming specialized software can reserve or pre-provision a dedupe index space 214.1 and a hot spare space 216.1 within the private space 210, as illustrated in FIG. 2b. For example, once the data storage system 104 is brought online, the dedupe index space 214.1 may store a deduplication index for the data deduplication component 126, and the unused hot spare space 216.1 may store a hot spare drive for the data rebuild component 122.

From time to time during operation of the data storage system 104, one of the plurality of storage drives 120.1, . . . , 120.m may fail (e.g., the storage drive 120.1, . . . , or 120.m may become unresponsive to storage IO requests). Further, the data rebuild component 122 may perform operations to rebuild the data of the failed storage drive on the hot spare drive stored in the currently unused hot spare space 216.1 of the private space 210. Once the data of the failed storage drive has been rebuilt on the hot spare drive stored in the hot spare space 216.1, the RAID manager managing the plurality of storage drives 120.1, . . . 120.m can send a request to the mapping manager 118 to return an amount of storage space (e.g., 4 TB) corresponding to the now used hot spare space 216.1. In response, the mapping manager 118 can perform garbage collection activities, using the available portions 208.2, 208.3, 208.4, 208.5 of the user space 212 at the mapping level 202, to recover the requested amount of storage space. Further, the mapping level 202 can return the recovered amount of storage space to the storage array level 204 for use as hot spare space for implementing a new hot spare drive.

Further, from time to time during operation of the data storage system 104, one or more data files stored in a file system on the storage drive array 114 may become corrupted, resulting in inconsistencies in at least some of the file system's metadata. In response, the data storage system 104 may be taken offline, and the FSCK component 124 may perform FSCK recovery operations to address and/or repair the metadata inconsistencies. Because, in this case, the data storage system 104 has been taken offline, the storage processing circuitry 110 can safely reprovision the currently unused hot spare space 216.1 (see FIG. 2b) as FSCK space 216.2 (see FIG. 2c). The FSCK component 124 can then use the FSCK space 216.2 for performing the FSCK recovery operations. Once the FSCK recovery operations have been completed, the storage processing circuitry 110 can reprovision the FSCK space 216.2 as hot spare space for implementing a new hot spare drive.

Figure 2D:
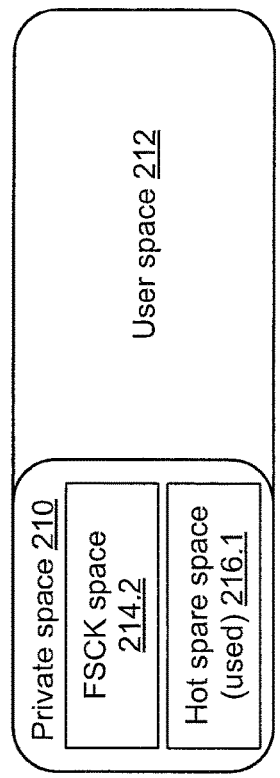

If, however, the hot spare space is currently used and unavailable (e.g., because data of a failed storage drive has been rebuilt on the hot spare drive, and the mapping manager 118 has not yet completed garbage collection operations or activities to recover storage space or returned the recovered storage space for use as hot spare space for a new hot spare drive), then the storage processing circuitry 110 can safely reprovision the dedupe index space 214.1 (see FIG. 2b) as FSCK space 214.2 (see FIG. 2d). The FSCK component 124 can then use the FSCK space 216.2 for performing the FSCK recovery operations. Once the FSCK recovery operations have been completed, the storage processing circuitry 110 can reprovision the FSCK space 214.2 as dedupe index space for the data deduplication component 126. After the data storage system 104 is brought back online, the data deduplication component 126 can regenerate SHA keys for the data elements currently stored on the data storage system 104, and provide the SHA keys as entries in a deduplication index stored in the reprovisioned dedupe index space.

Figure 3:
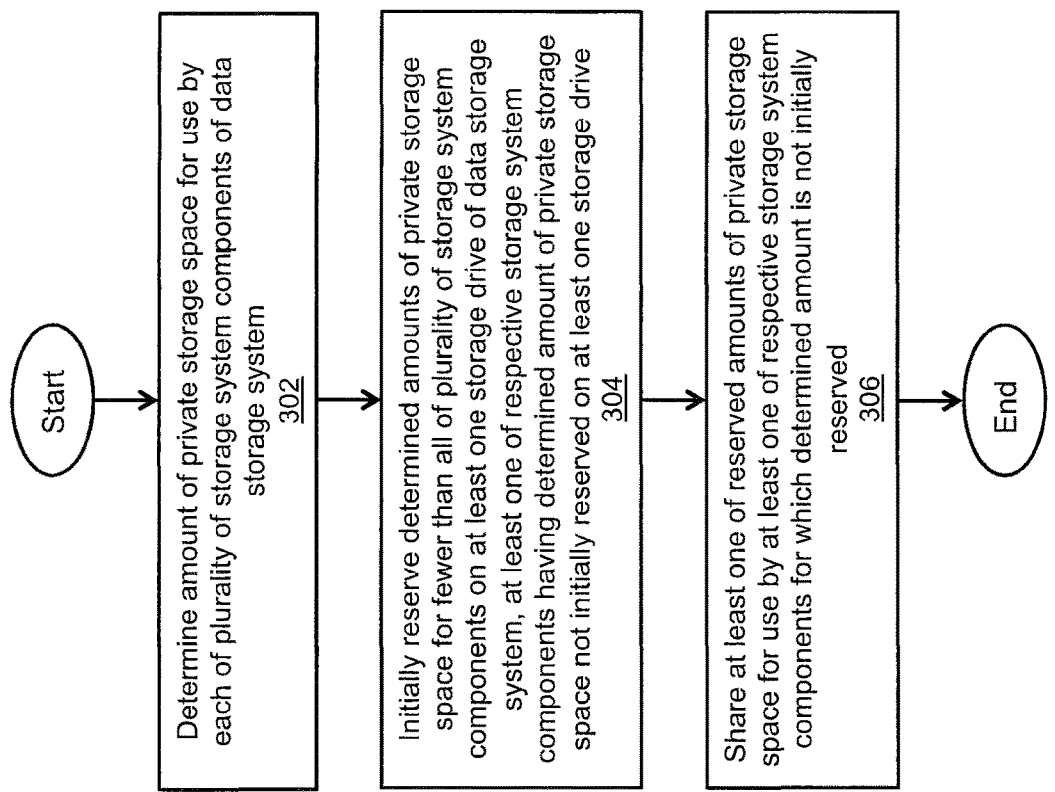
FIG. 3 is a flow diagram illustrating an exemplary method of sharing private storage space among storage system components of a data storage system.

A method of sharing private storage space among storage system components of a data storage system is described below with reference to FIG. 3. As depicted in block 302, an amount of private storage space is determined for use by each of a plurality of storage system components of a data storage system. As depicted in block 304, the determined amounts of private storage space for fewer than all of the plurality of storage system components are initially reserved on at least one storage drive of the data storage system, at least one of the respective storage system components having a determined amount of private storage space not initially reserved on the at least one storage drive. As depicted in block 306, at least one of the reserved amounts of private storage space is shared for use by at least one of the respective storage system components for which the determined amount is not initially reserved.

Having described the foregoing illustrative embodiments, other alternative embodiments and/or variations may be made and/or practiced. For example, it was described herein that the hot spare space 138 (see FIG. 1c) could be initially reserved or provisioned in the private space 132 for the data rebuild component 122 (see FIG. 1b), and that the dedupe index space 136 (see FIG. 1c) could be initially reserved or provisioned in the private space 132 for the data deduplication component 126 (see FIG. 1b). It was further described herein that, if data files stored in a file system on the data storage system 104 (see FIG. 1a) become corrupted and the hot spare space 138 has not yet been used by the data rebuild component 122, then the FSCK component 124 could perform offline FSCK recovery operations using the hot spare space 138. Otherwise, if the hot spare space 138 has been used and is now unavailable, then the FSCK component 124 could perform offline FSCK recovery operations using the dedupe index space 136. In various embodiments, private storage space can be reserved or provisioned for a storage system component to provide whatever storage protection is demanded or required by the storage system component. For example, the hot spare space 138 can be configured as RAID-5 for the data rebuild component 122 to provide suitable storage protection for host or user data. Further, the dedupe index space 136 can be configured as RAID-1 for the data deduplication component 126 to provide suitable storage protection for hash value identifiers or other metadata. In addition, if the FSCK component 124 performs offline FSCK recovery operations using the dedupe index space 136, then the dedupe index space 136 can be reconfigured as RAID-5 for the FSCK component 124 to provide suitable storage protection for host or user data.

While various embodiments of the disclosure have been particularly shown and described, it will be understood by those skilled in the art that various changes in form and details may be made therein without departing from the scope of the disclosure as defined by the appended claims.

What is claimed is:

1. A method of sharing private storage space among storage system components of a data storage system, comprising:

determining a first amount of private storage space for use by a data rebuild component of a data storage system;

determining a second amount of private storage space for use by a file system checking (FSCK) component of the data storage system;

determining a third amount of private storage space for use by a data deduplication component of the data storage system;

determining a sum of (i) the first amount of private storage space determined for use by the data rebuild component and (ii) a maximum of (a) the second amount of private storage space determined for use by the FSCK component and (b) the third amount of private storage space determined for use by the data deduplication component;

allocating, in the data storage system, an amount of private storage space equal to the determined sum; and sharing the allocated amount of private storage space among the data rebuild component, the FSCK component, and the data deduplication component of the data storage system.

2. The method of claim 1 further comprising:

initially provisioning the first amount, the second amount, and the third amount of private storage space for fewer than all of the data rebuild component, the FSCK component, and the data deduplication component on at least one storage drive of the data storage system, at least one of the data rebuild component, the FSCK component, and the data deduplication component having a determined amount of private storage space not initially provisioned on the at least one storage drive.

3. The method of claim 2 wherein the initially provisioning of the first amount, the second amount, and the third amount of private storage space includes initially provisioning, as a deduplication index in the allocated amount of the private storage space, the third amount of private storage space determined for use by the data deduplication component.

4. The method of claim 3 wherein the initially provisioning of the first amount, the second amount, and the third amount of private storage space includes initially provisioning, as a hot spare drive in the allocated amount of the private storage space, the first amount of private storage space determined for use by the data rebuild component in the allocated amount of the private storage space.

5. The method of claim 4 further comprising:

detecting a failure of a failed storage drive of the data storage system; and performing, by the data rebuild component, a data rebuild operation to rebuild data of the failed storage drive on the hot spare drive.

6. The method of claim 4 wherein the data storage system includes a file system, and wherein the method further comprises:

detecting corruption of a data file of the file system; and having detected the corruption of the data file, taking the data storage system offline.

7. The method of claim 6 further comprising:
re-provisioning the first amount of private storage space initially provisioned as the hot spare drive for use by the FSCK component; and
performing, by the FSCK component, an FSCK recovery operation to recover inconsistent metadata of the file system to a consistent state using the re-provisioned first amount of private storage space.

8. The method of claim 6 further comprising:
determining that the hot spare drive is unavailable; and
re-provisioning the third amount of private storage space initially provisioned as the deduplication index for use by the FSCK component.

9. The method of claim 8 further comprising:
performing, by the FSCK component, an FSCK recovery operation to recover inconsistent metadata of the file system to a consistent state using the re-provisioned third amount of private storage space.

10. The method of claim 9 further comprising:
having performed the FSCK recovery operation, re-provisioning the third amount of private storage space provisioned for use by the FSCK component as another deduplication index; and
bringing the data storage system back online.

11. A data storage system, comprising:
at least one storage drive;
a memory; and
storage processing circuitry configured to execute a computer program out of the memory:
to determine a first amount of private storage space for use by a data rebuild component of a data storage system;
to determine a second amount of private storage space for use by a file system checking (FSCK) component of the data storage system;
to determine a third amount of private storage space for use by a data deduplication component of the data storage system;
to determine a sum of (i) the first amount of private storage space determined for use by the data rebuild component and (ii) a maximum of (a) the second amount of private storage space determined for use by the FSCK component and (b) the third amount of private storage space determined for use by the data deduplication component;
to allocate, in the data storage system, an amount of private storage space equal to the determined sum; and
to share the allocated amount of private storage space among the data rebuild component, the FSCK component, and the data deduplication component of the data storage system.

12. The data storage system of claim 11 wherein the storage processing circuitry is further configured to execute the computer program out of the memory to initially provision the first amount, the second amount, and the third amount of private storage space for fewer than all of the data rebuild component, the FSCK component, and the data deduplication component on at least one storage drive of the data storage system, at least one of the data rebuild component, the FSCK component, and the data deduplication component having a determined amount of private storage space not initially provisioned on the at least one storage drive.

13. The data storage system of claim 12 wherein the storage processing circuitry is further configured to execute the computer program out of the memory:
to initially provision, as a deduplication index in the allocated amount of the private storage space, the third amount of private storage space determined for use by the data deduplication component; and
to initially provision, as a hot spare drive in the allocated amount of the private storage space, the first amount of private storage space determined for use by the data rebuild component in the allocated amount of the private storage space.

14. The data storage system of claim 13 wherein the data storage system includes a file system, and wherein the storage processing circuitry is further configured to execute the computer program out of the memory:
to detect corruption of a data file of the file system;
having detected the corruption of the data file, to take the data storage system offline;
to re-provision the first amount of private storage space initially provisioned as the hot spare drive for use by the FSCK component; and
to perform, by the FSCK component, an FSCK recovery operation to recover inconsistent metadata of the file system to a consistent state using the re-provisioned first amount of private storage space.

15. The data storage system of claim 13 wherein the storage processing circuitry is further configured to execute the computer program out of the memory:
to determine that the hot spare drive is unavailable;
to re-provision the third amount of private storage space initially provisioned as the deduplication index for use by the FSCK component; and
to perform, by the FSCK component, an FSCK recovery operation to recover inconsistent metadata of the file system to a consistent state using the re-provisioned third amount of private storage space.

16. The data storage system of claim 15 wherein the storage processing circuitry is further configured to execute the computer program out of the memory:
having performed the FSCK recovery operation, to re-provision the third amount of private storage space provisioned for use by the FSCK component as another deduplication index; and
to bring the data storage system back online.

17. A computer program product including a set of non-transitory, computer-readable media having instructions that, when executed by processing circuitry of a computerized apparatus, cause the processing circuitry to perform a method of sharing private storage space among storage system components of a data storage system, the method comprising:
determining a first amount of private storage space for use by a data rebuild component of a data storage system;
determining a second amount of private storage space for use by a file system checking (FSCK) component of the data storage system;
determining a third amount of private storage space for use by a data deduplication component of the data storage system;
determining a sum of (i) the first amount of private storage space determined for use by the data rebuild component and (ii) a maximum of (a) the second amount of private storage space determined for use by the FSCK component and (b) the third amount of private storage space determined for use by the data deduplication component;

allocating, in the data storage system, an amount of private storage space equal to the determined sum; and sharing the allocated amount of private storage space among the data rebuild component, the FSCK component, and the data deduplication component of the data storage system.

* * * * *